No. 857,154. PATENTED JUNE 18, 1907.
J. M. BRYANT.
THILL COUPLING.
APPLICATION FILED MAR. 14, 1906.

Witnesses.
E. W. Jeppesen.
A. H. Opsahl.

Inventor.
John M. Bryant.
By his Attorneys
Williamson & Merchant

UNITED STATES PATENT OFFICE.

JOHN M. BRYANT, OF CLEVELAND, OHIO.

THILL-COUPLING.

No. 857,154.  Specification of Letters Patent.  Patented June 18, 1907.

Application filed March 14, 1906. Serial No. 305,972.

*To all whom it may concern:*

Be it known that I, JOHN M. BRYANT, a citizen of the United States, residing at Cleveland, in the county of Cuyahoga and State of Ohio, have invented certain new and useful Improvements in Thill-Couplings; and I do hereby declare the following to be a full, clear, and exact description of the invention, such as will enable others skilled in the art to which it appertains to make and use the same.

My present invention has for its object to provide an improved coupling for thills, poles, etc., and to this end it consists of the novel devices and combination of devices hereinafter described and defined in the claims.

The improved coupling is illustrated in the accompanying drawings, wherein like characters indicate like parts throughout the several views.

Figure 1:
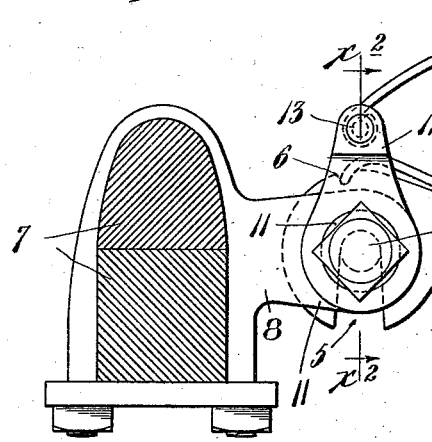
Figure 2:
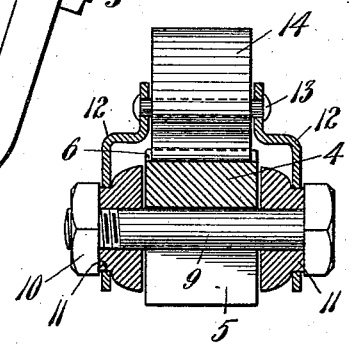
Figure 3:
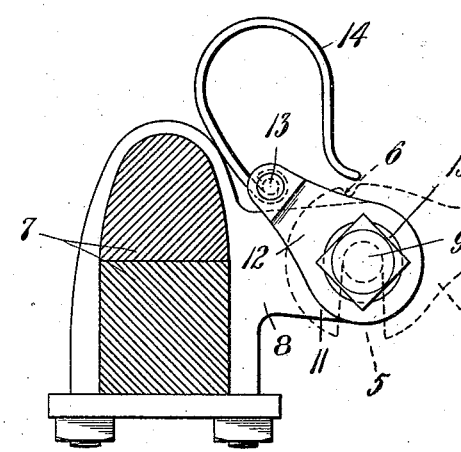
Figure 4:
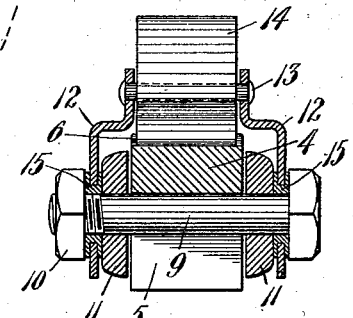

Figure 1 is a view principally in side elevation, but with some parts sectioned, showing a portion of a pair of thills and the front axle of a vehicle, said parts being connected by one of my improved couplings. Fig. 2 is a vertical section taken on the line $x^2 \, x^2$ of Fig. 1. Fig. 3 is a view corresponding to Fig. 1, but illustrating a different position of the parts, and with some parts indicated by dotted lines only; and Fig. 4 is a view corresponding to Fig. 2, but illustrating a slightly modified construction.

The numeral 1 indicates a portion of a thill, to which metallic straps 2 (only one of which is shown) are rigidly secured in the ordinary or any suitable way, as by nutted bolts 3. The straps 2, at their projecting ends, terminate in heads 4 that are formed with downwardly extended open seats 5, and are provided at their tops with notches or depressions 6.

The numeral 7 indicates the front axle of a vehicle, which is provided with the ordinary bifurcated thill coupling brackets 8, (only one of which is shown). A coupling bolt 9 is passed through the ears of the bracket 8, and is provided at its threaded end with a nut 10.

In the construction illustrated in Figs. 1, 2 and 3, the ears of the bracket 8 are formed with bearing hubs or bosses 11, against one of which the head of the bolt 9 is drawn, and against the other of which the nut 10 is tightened. Loosely pivoted on the hubs 11, are links 12, the free ends of which extend upward, are bent inward, and then upward, and are rigidly connected or tied together, but spaced apart, by a long rivet 13. One end of a U-shaped leaf spring 14 is pivotally mounted on the rivet 13 between the free ends of the links 12. The links 12 and rivet 13 constitute a yoke which affords a support for the spring 14, and the form of the spring 14 is such that when its free end is engaged with the notch 6 of the strap-head 4, while the said strap-head is applied on the bolt 9, and the said spring is then turned forward from the position indicated in Fig. 3 into the position indicated in Fig. 1, the head 4 will be locked on the bolt 9 and the said spring will be locked to the strap 2 and head 4 because the said spring is then turned beyond a dead center. With this construction, it follows that when the thills are moved upward and downward by the movement of the horse, or from other cause, the strap 2, links 12, and spring 14 will move together around the axis of the bolt 9, and will not change their relative position with respect to each other. In order that the above relative movements may take place, it is necessary that the links 12 move pivotally on the same axis as the head 4. It is also desirable that the said links have a bearing which is distinct from the coupling bolt 9, and it is also desirable that the nut of the said bolt may be tightened without putting increased friction upon the said links.

In Fig. 4, the links 12 are loosely pivoted on grooved washers or flanged bushings 15, which are securely clamped, in the one instance between the head of the bolt 9 and the adjacent prong of the bracket 8, and in the other instance between the nut 10 and the adjacent prong of said bracket 8.

The coupling above described is extremely efficient, and is of small cost. Furthermore, it is capable of being very quickly and easily manipulated, either to secure or release the thills or the pole.

What I claim and desire to secure by Letters Patent of the United States is as follows:

1. The combination with a coupling bracket having laterally spaced ears and a bolt passed therethrough, of a detachable member having a head provided with an open seat engageable with said bolt and having a lock notch opposite to said seat, link bearings independent of but surrounding said bolt and rigidly secured with respect thereto and with respect to the ears of said coupling bracket, a pair of links loosely pivoted on said link bearings, and an approximately U-shaped spring pivoted at one end to the free end of said links and engageable at its other end with the said lock notch of said head, to hold the seat of said head engaged with said bolt, substantially as described.

2. The combination with a coupling bracket having laterally spaced ears and a bolt passed therethrough, of a detachable member having a head with an open seat engageable with said bolt, and a lock notch opposite to said seat, a pair of peripherally grooved washers on said bolt, a pair of links loosely pivoted in the grooves of said washers, and a U-shaped spring pivotally connected to the free end of said links and engageable at its free end with the lock notch of said head, to hold the seat of said head engaged with said bolt, substantially as described.

In testimony whereof I affix my signature in presence of two witnesses.

JOHN M. BRYANT.

Witnesses:
C. O. PETERSON,
LEO L. LOZIER.